June 30, 1925.
H. A. STILSON
AUTOMATIC ANIMAL TRAP
Filed April 28, 1923
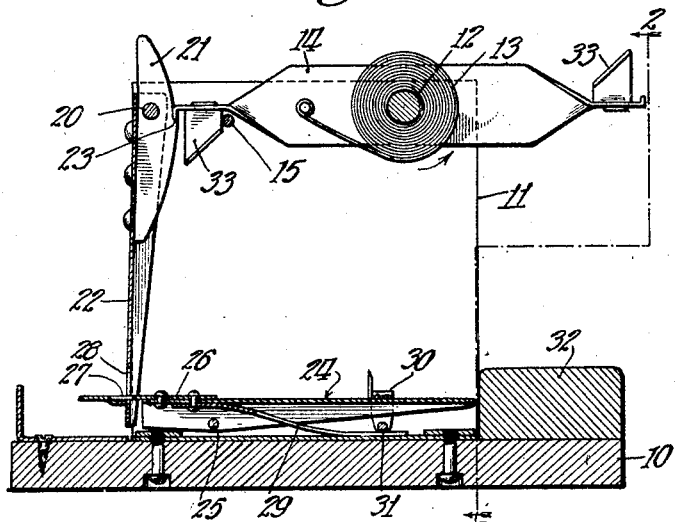
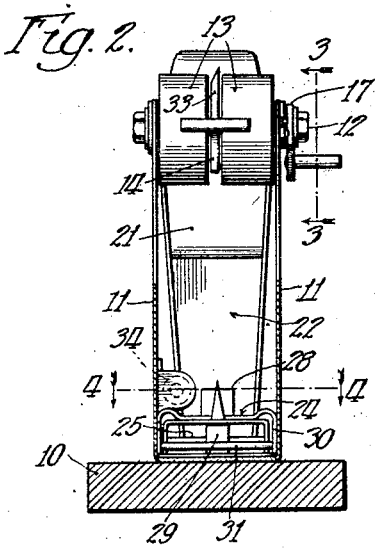
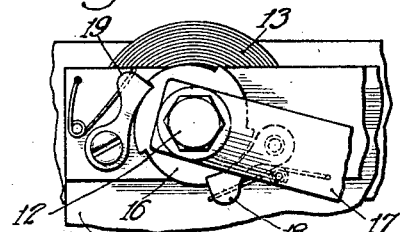
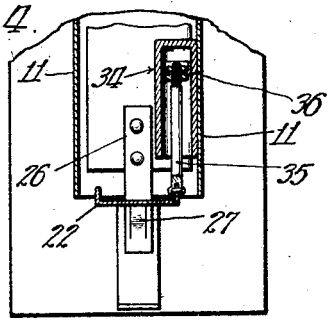
Inventor.
Herbert A. Stilson
By George E. Mueller
Atty.

Patented June 30, 1925.

1,543,884

UNITED STATES PATENT OFFICE.

HERBERT A. STILSON, OF CHICAGO, ILLINOIS.

AUTOMATIC ANIMAL TRAP.

Application filed April 28, 1923. Serial No. 635,354.

*To all whom it may concern:*

Be it known that I, HERBERT A. STILSON, citizen of the United States, residing at Chicago, in the county of Cook and State of Illinois, have invented a certain new and useful Improvement in Automatic Animal Traps, of which the following is a full, clear, concise, and exact description, reference being had to the accompanying drawings, forming a part of this specification.

My invention relates to automatic animal traps and it has for its principal object the provision of a form and arrangement of parts by which a trap shall be capable of taking care of a plurality of rats or other animals in succession without the necessity for repeated manual setting operations. To this end, it is the object of my invention to provide numerous novel features of construction as illustrated in the accompanying drawing and as hereinafter specifically described. That which I believe to be new and desire to cover by Letters Patent is set forth in the claims.

In the drawing,

Fig. 1 is a longitudinal sectional view through my improved trap;

Fig. 2 is an end view, partly in section, taken on line 2—2 of Fig. 1;

Fig. 3 is an enlarged view, being partly in section, taken on line 3—3 of Fig. 2; and Fig. 4 is a horizontal sectional view taken on line 4—4 of Fig. 2.

Referring to the several figures of the drawings in which corresponding parts are indicated by the same reference characters, 10 indicates a base plate having a framework 11 preferably in the form of a housing of sheet metal rising therefrom. Revolubly mounted in transverse position in the framework 11 near its upper end and near the front edge thereof, I have provided a shaft 12 upon which are mounted two springs 13, the inner ends of which are rigidly secured to the shaft. Revolubly mounted upon the shaft 12 between the springs 13 there is an arm 14, in the form of a bar, the outer ends of the springs 13 being secured to the bar 14 in such a manner that the springs may be utilized for revolving the arms 14 about the shaft. As is shown in Fig. 1, a pin 15 may be inserted in position beneath the arm 14 when the trap is not in use for holding the arm against rotation.

For winding the springs 13, I have provided a ratchet 16 fixedly mounted upon the shaft 12. Revolubly mounted upon the outer end of the shaft 12 adjacent to the ratchet 16 there is a crank arm 17 provided with a spring-pressed pawl 18 whereby the shaft 12 can be rotated in counterclockwise direction in Fig. 1 and clockwise in Fig. 3, the shaft being held against rotation in the reverse direction by a spring-pressed pawl 19 mounted upon the framework 11 in position to engage the ratchet 16. The arrangement is preferably such that when the springs are completely wound they are capable of giving the arm 14 a considerable number of complete revolutions in counterclockwise direction in Fig. 1.

As is clearly shown in Fig. 1, the rear end of the arm 14 stands in engagement with a latch member pivotally mounted upon a transversely-extending pin 20, such latch member comprising a heavy plate 21 and an arm 22, which, in the construction shown, is formed of sheet metal bent into channel form. The heavy plate 21, which may be of cast metal, is attached inside the channel of the arm 22, the parts 21 and 22 being riveted together by three rivets the heads of which are shown in Fig. 1. Thus the two parts 21 and 22 swing together on the shaft 20. The latch comprises a shoulder 23 formed in the front face of the plate 21 substantially opposite the pin 20 adapted in the normal position of the latch to hold the arm 14 against rotation under the influence of the springs 13. As will be readily understood, when the latch 22 is released so as to be permitted a rotary movement on its shaft 20 in clockwise direction in Fig. 1 the pressure of the springs 13 upon the shoulder 23 will serve to swing the plate 21 in clockwise direction in said Fig. 1 so as to permit the end of the arm 14 to pass. When thereafter the opposite end of the arm 14 comes in contact with the diagonally disposed front face of the plate 21, the latch member will be in turn rotated in the reverse direction into the normal position shown in Fig. 1 with the end of the arm 14 in contact with the shoulder 23, the end of the arm 14 thus engaged being, of course, the opposite end from that formerly engaged.

For holding the latch member releasably in operative position as shown in Fig. 1, I have provided a trigger 24 pivotally mounted upon a transversely-extending pin 25. In the construction shown, the trigger 24 is formed of sheet metal bent into shape, being provided at its rear end with a plate 26 having a prong 27 struck downwardly therefrom for engaging the arm 22 of the latch through the opening 28 of which the plate 26 extends. A spring 29 of any approved type is mounted upon the under face of the trigger 24 for holding the trigger normally in operative position as shown in Fig. 1 for insuring automatic engagement between the trigger and the latch.

Near the forward end of the trigger 24 I have provided a bait plate 30 in the form of a yoke which straddles the trigger, being mounted upon a transversely-extending pin 31. As will be readily understood, when the bait plate 30 is given a movement longitudinally of the trigger 24, a multiplied power effect is produced tending to move the trigger downwardly for releasing the latch.

In front of the trigger 24, I have provided a block 32 at a slightly higher level than the adjacent end of the trigger, serving to increase the difficulty which a rat or other animal would have in attempting to steal the bait from the plate 30 without putting its weight directly upon the trigger.

In operation, with the pin 15 removed, and with the springs 13 wound up, and with the parts in the position as shown in Fig. 1, when the trigger 24 is depressed the latch will be released so as to swing in clockwise direction in Fig. 1, permitting the arm 14 to rotate in counterclockwise direction in said figure. The trigger 24 and the bait plate 30 are located in close proximity to the path of movement of the ends of the arm 14, and the ends of the arm 14 are preferably provided with blades 33 extending in advance in the rotation of the arm 14. It will thus be appreciated that if a rat or other animal swings the trigger 24 downwardly in an effort to loosen the bait from the plate 30, one of the blades 33 will be brought around very forcibly into contact with the animal. The trap is designed to operate with such force that the animal will be thrown bodily a considerable distance from the trap. In use, it has been found that the blades 33 ordinarily catch a rat in the throat, inflicting sufficient injury to cause the speedy death of the rat.

I have found in practice that with the springs 13 wound tight, there is a tendency for the arm 14 in contacting the diagonally-disposed face of the latch member to throw the latch 22 by its rebound in counterclockwise direction in Fig. 1 with such force and speed that the trigger 24 is given such an impetus by the engagement of the arm 22 with the prong 27 that the latch is permitted to swing again in clockwise direction in said Fig. 1 under the influence of the springs 13 without attaining operative engagement with the trigger. In order to overcome this difficulty, I have provided means for slowing up the movement of the latch, such means in the construction illustrated comprising a cylinder 34 mounted upon the framework 11 opposite the lower end of the latch member. Pivotally connected with the lower end of the latch member I have provided a piston rod 35 having upon its forward end a dished leather washer 36 adapted to fit snugly within the cylinder 34. The arrangement is such that when the piston rod 35 is moved rearwardly air is permitted to enter the cylinder and that when the piston rod is again moved forwardly the trapped air is compressed sufficiently to slow up the movement of the latch so as to insure operative engagement between the latch and the trigger.

While I prefer to employ the construction and arrangement as illustrated in the drawing, it will be understood that I do not wish to be restricted to the use of the detailed form of construction except as the same may be hereinafter specifically claimed, inasmuch as it is evident that various changes might be made in the form of the parts without departing from the spirit of the invention.

What I claim as new and desire to secure by United States Letters Patent is:

1. An automatic animal trap comprising a rotary striker, a spring for rotating the striker, a pivotally mounted depending arm having a stop for holding the striker, a trigger for holding the arm whereby when released the striker rotates the stop and arm to free the striker, and a cam carried by the arm engaged by the striker as it returns on its rotation to gradually slow down the striker as it re-engages the stop and rotate the arm to be re-engaged and held by the trigger, and means acting upon the arm to slow its movement by the impact of the striker so as to positively effect holding re-engagement of the arm by the trigger 2. An automatic animal trap comprising a rotary striker, a spring for rotating the striker, a pivotally mounted depending arm having a stop for holding the striker, a trigger for holding the arm whereby when released the striker rotates the stop and arm to free the striker, and a cam carried by the arm engaged by the striker as it returns on its rotation to gradually slow down the striker as it re-engages the stop and rotate the arm to be re-engaged and held by the trigger, and a dash pot for the arm set to retard its rotation by the impact of the striker so as to positively effect holding re-engagement of the arm by the trigger.

3. In an automatic animal trap, a U-shaped frame, a shaft mounted across the legs of the frame, a rotary striker revolubly mounted on the shaft intermediate the legs of the frame, a trigger released arm for normally holding the striker against rotation, two springs on the shaft, one mounted on each side of the striker to guide the latter and having one end attached to the striker and the other end to the shaft and means for rotating the shaft to wind the springs independent of movement of the striker.

4. In an automatic animal trap, a trigger lever pivotally mounted and having an operating end extending from the pivot, and a bait member comprising a U-shaped member spanning the extension on the trigger lever and pivotally mounted below the extension, and a spring pressing the extension against the yoke of the bait member, whereby rocking of the bait member will depress the extension to operate the trigger.

In witness whereof, I hereunto subscribe my name this 24th day of March A. D., 1923.

HERBERT A. STILSON.